United States Patent
Kim et al.

(10) Patent No.: US 11,151,032 B1
(45) Date of Patent: Oct. 19, 2021

(54) SYSTEM AND METHOD FOR LOCAL CACHE SYNCHRONIZATION

(71) Applicant: COUPANG CORP., Seoul (KR)

(72) Inventors: Seokhyun Kim, Seoul (KR); Yixiang Huang, Redmond, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/120,884

(22) Filed: Dec. 14, 2020

(51) Int. Cl.
*G06F 12/0802* (2016.01)
*G06F 12/0831* (2016.01)

(52) U.S. Cl.
CPC ...... *G06F 12/0802* (2013.01); *G06F 12/0833* (2013.01)

(58) Field of Classification Search
CPC ............. G06F 12/0802; G06F 12/0833; G06F 12/0815; G06F 12/0806; G06F 12/0808; G06F 12/0813; G06F 12/0817; G06F 12/082; G06F 12/0822; G06F 12/0831; G06F 12/0824; G06F 12/084; G06F 9/505; G06F 9/5083; G06F 9/5088
See application file for complete search history.

(56) References Cited

U.S. PATENT DOCUMENTS

| | | | |
|---|---|---|---|
| 6,205,481 B1* | 3/2001 | Heddaya | H04L 67/2842 709/226 |
| 6,618,705 B1* | 9/2003 | Wang | G06Q 20/02 705/26.44 |
| 6,792,436 B1 | 9/2004 | Zhu et al. | |
| 2003/0088442 A1 | 5/2003 | Michael et al. | |
| 2003/0236957 A1* | 12/2003 | Miller | G06F 12/0813 711/163 |
| 2004/0073755 A1* | 4/2004 | Webb, Jr. | G06F 12/0826 711/144 |
| 2004/0088496 A1* | 5/2004 | Glasco | G06F 12/082 711/141 |
| 2005/0160226 A1* | 7/2005 | Averill | G06F 12/0891 711/133 |
| 2006/0195525 A1* | 8/2006 | Page | G06F 9/505 709/206 |

(Continued)

OTHER PUBLICATIONS

Notice of Preliminary Rejection issued in Korean Patent Application No. 10-2021-7019001 dated Jul. 30, 2021, 10 pgs.

*Primary Examiner* — Michael Krofcheck
(74) *Attorney, Agent, or Firm* — Finnegan, Henderson, Farabow, Garrett & Dunner LLP

(57) ABSTRACT

A computer-implemented method for synchronizing local caches is disclosed. The method may include receiving a content update which is an update to a data entry stored in local caches of each of a plurality of remote servers. The method may include transmitting the content update to a first remote server to update a corresponding data entry in a local cache of the first remote server. Further, the method may include generating an invalidation command, indicating the change in the corresponding data entry. The method may include transmitting the invalidation command from the first remote server to the message server. The method may include generating, by the message server, a plurality of partitions based on the received invalidation command. The method may include transmitting, from the message server to each of the remote servers, the plurality of partitions, so that the remote servers update their respective local caches.

17 Claims, 10 Drawing Sheets

(56) References Cited

U.S. PATENT DOCUMENTS

| | | |
|---|---|---|
| 2010/0174863 A1 | 7/2010 | Cooper et al. |
| 2010/0228819 A1* | 9/2010 | Wei .................... H04L 67/1095 709/203 |
| 2011/0131326 A1 | 6/2011 | Medard et al. |

* cited by examiner

SYSTEM AND METHOD FOR LOCAL CACHE SYNCHRONIZATION

TECHNICAL FIELD

The present disclosure generally relates to computerized systems and methods for synchronizing local caches. In particular, embodiments of the present disclosure relate to inventive and unconventional systems for efficiently synchronizing local caches of a plurality of remote servers based on an update to one or more of the local caches of some of the remote servers.

BACKGROUND

In the field of on-line retail business, information relating to a variety of products are stored in databases. When a shopper browses display interfaces of the on-line retail business (such as web pages), server systems retrieve this information from the databases for display to the shopper. Moreover, based on the displayed item, shoppers may interact with the displayed interfaces to place orders for the items.

The various programs and applications supporting the aforementioned interactions with the on-line retail system may be executed by remote servers. For example, since the on-line retail system must support interactions with many shoppers, a single computer server may not be able to practically support all of the necessary functions. Thus, multiple servers may be utilized in such a way that those functions are distributed among the different servers. These multiple servers may be referred to as remote servers. Therefore, some shoppers may interact with the on-line retail system through one remote server, while other shoppers may interact with the on-line retail system through another remote server.

Regardless of how many remote servers needed to support the number of shoppers, different remote servers should function identically from the point of view of the shoppers. That is, shoppers interacting with the on-line retail system should not experience any difference based on which remote server is supporting the interaction. For example, product listing, promotions, search results, and/or other product or shopping related information or function should be identical across all remote servers when viewed by shoppers.

Conventional methods and systems use one or more centralized databases to supply data to the remote servers, such that the different remote servers all access the same data. Moreover, changes may be made to the on-line retail system by updating the centralized database, and all remote servers would have access to the updated data. However, conventional methods and systems can lead to high network traffic, particularly if the remote servers require constant fetching of data from the centralized database. The high network traffic in turn may cause delays, mitigation of which may require expensive hardware infrastructure.

SUMMARY

One aspect of the present disclosure is directed to a computer-implemented system for synchronizing local caches, compromising: one or more processors; at least one memory storage device storing instructions that when executed by the one or more processors, perform operations comprising: receiving a content update, the content update being an update to a data entry stored in local caches of each of a plurality of remote servers; transmitting the content update to a first remote server of the remote servers to update a corresponding data entry in a local cache of the first remote server; generating an invalidation command to a message server, the invalidation command being configured to indicate the change in the corresponding data entry in the local cache of the first remote server; transmit the invalidation command from the first remote server to the message server; generating, by the message server, a plurality of partitions based on the received invitation command; transmitting, from the message server to each of the remote servers, the plurality of partitions, wherein the plurality of partitions cause the remote servers to update their respective local caches.

Another aspect of the present disclosure is directed to a computer-implemented method for synchronizing local caches, compromising: receiving a content update, the content update being an update to a data entry stored in local caches of each of a plurality of remote servers; transmitting the content update to a first remote server of the remote servers to update a corresponding data entry in a local cache of the first remote server; generating an invalidation command to a message server, the invalidation command being configured to indicate the change in the corresponding data entry in the local cache of the first remote server; transmit the invalidation command from the first remote server to the message server; generating, by the message server, a plurality of partitions based on the received invitation command; transmitting, from the message server to each of the remote servers, the plurality of partitions, wherein the plurality of partitions cause the remote servers to update their respective local caches.

Yet another aspect of the present disclosure is directed to A computer-implemented system for synchronizing local caches, compromising: one or more processors; at least one memory storage device storing instructions that when executed by the one or more processors, perform operations comprising: receiving a content update, the content update being a command to remove a data entry stored in local caches of a plurality of remote servers; transmitting the content update to a first remote server of the remote servers to remove a corresponding data entry in the local cache of the first remote server; generating an invalidation command to a message server, the invalidation command being configured to remove the corresponding data entry in the local cache of the first remote server; transmitting the invalidation command from the first remote server to a message server, the message server being a stream processing server; generating, by the message server, a plurality of partitions, each of the partitions including a copy of the invalidation command; transmitting, from the message server to the remote servers, the partitions, wherein the partitions cause the remote servers to remove a corresponding data entry in their respective local caches.

Other systems, methods, and computer-readable media are also discussed herein.

DETAILED DESCRIPTION

Figure 1A:
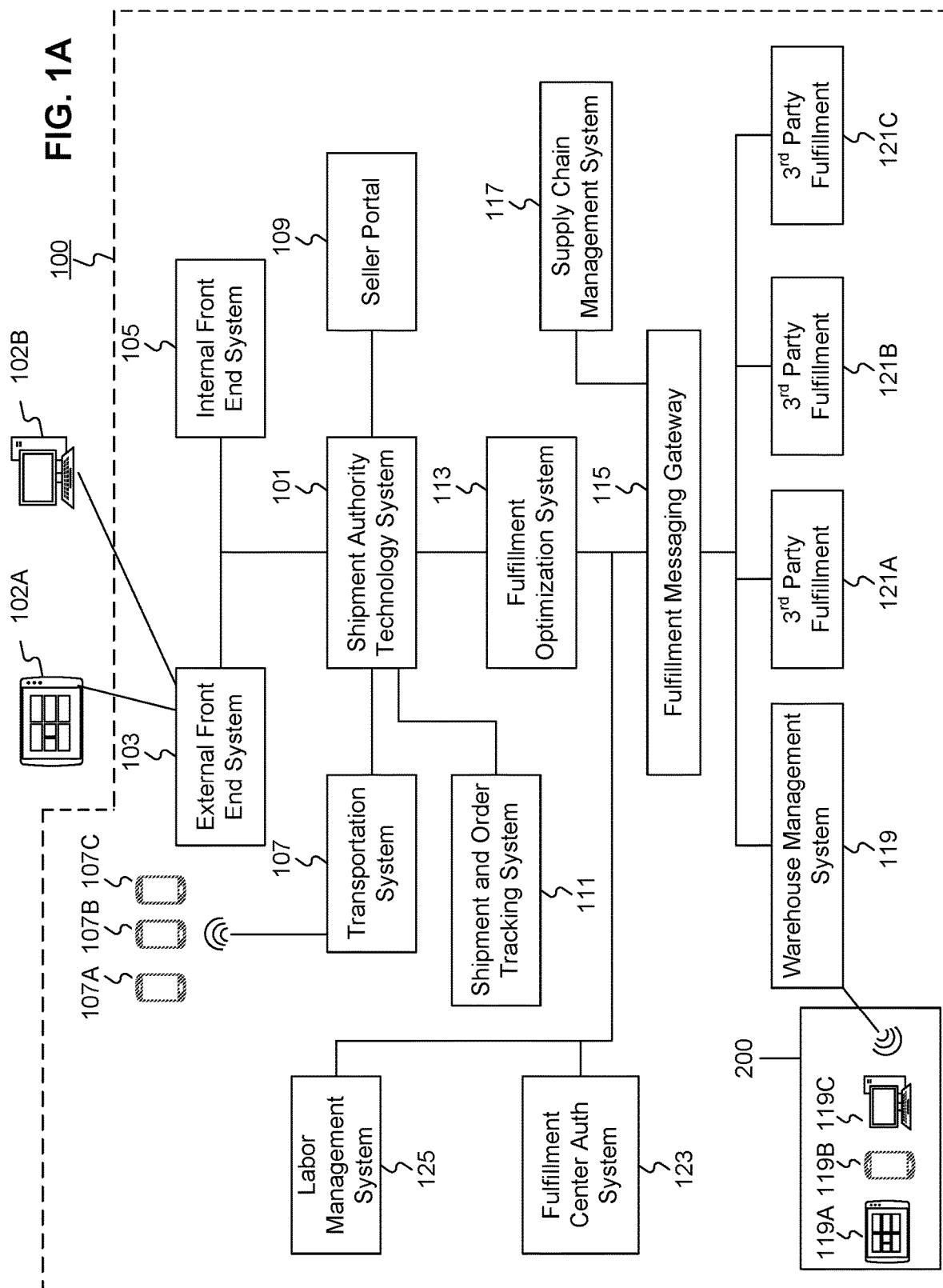
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
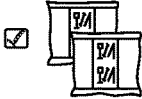
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
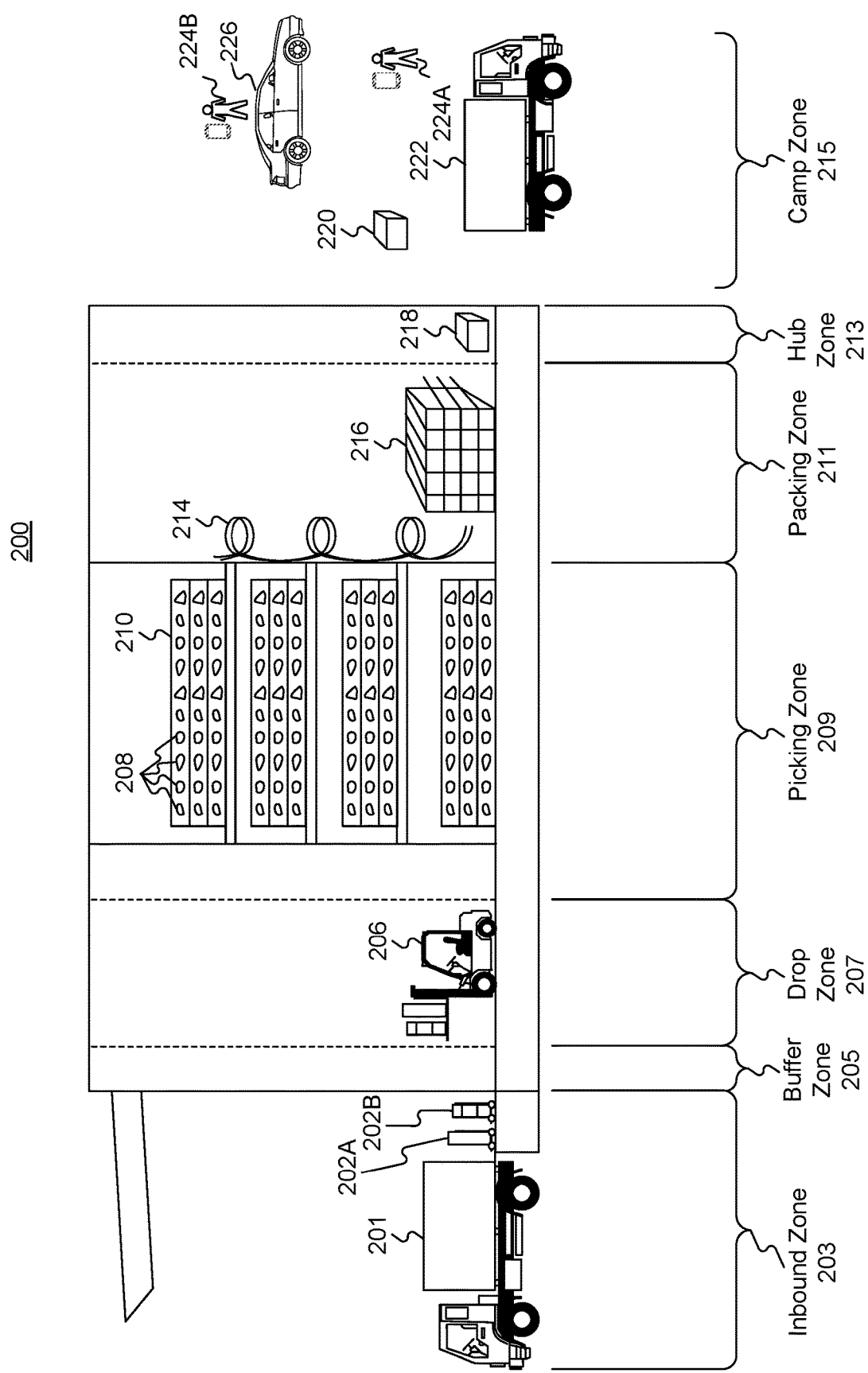
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
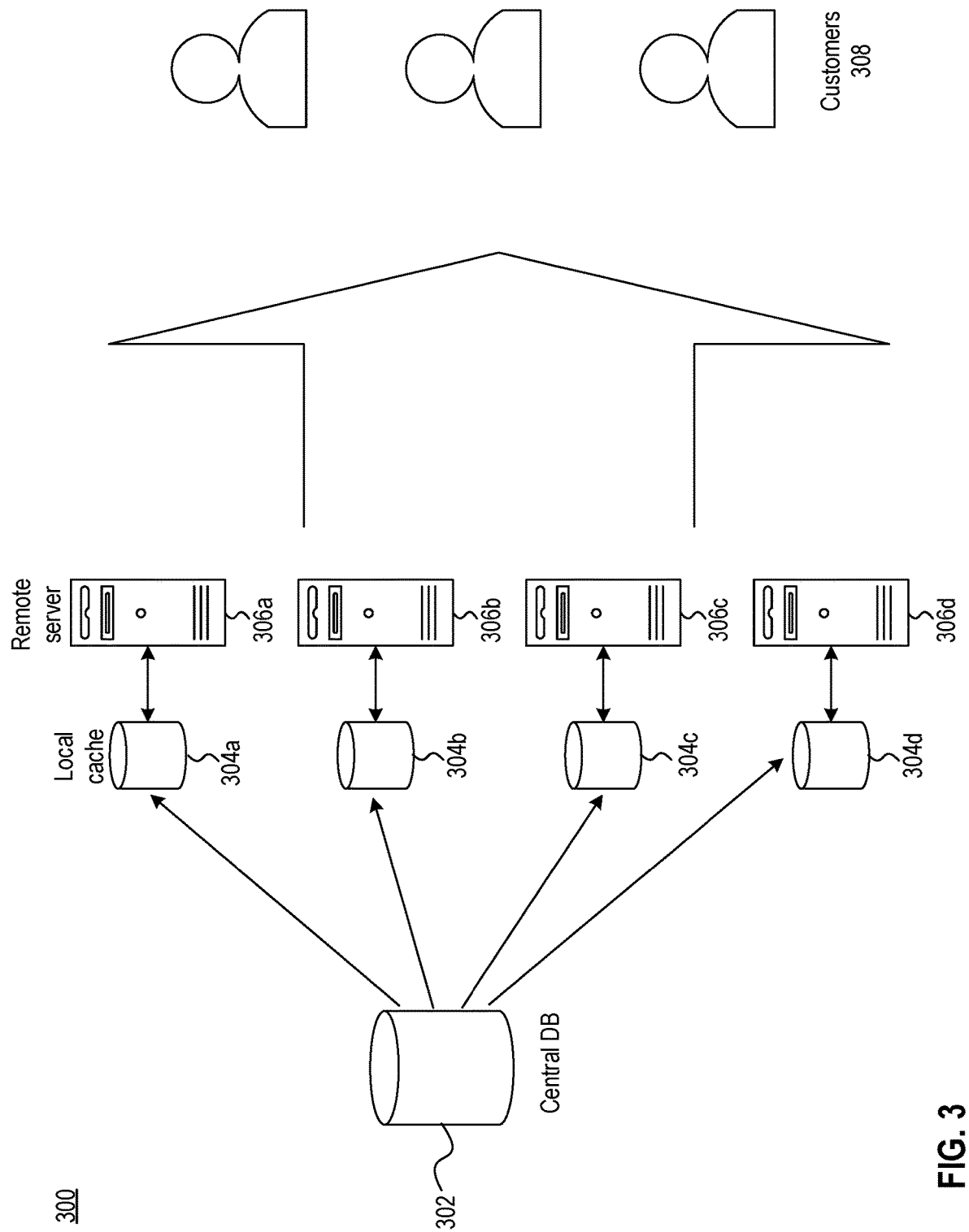
FIG. 3 is a schematic diagram of an exemplary system including a plurality of remote servers and local caches, consistent with the disclosed embodiments.

According to some embodiments of the present disclosure, system 100 or one or more of its subsystems (e.g. external front end system 103) may be implemented in multiple server devices, or virtual servers in a cloud computing environment. These server devices or virtual servers may be collectively referred to as remote servers hereafter. The remote servers may include components and functions similar to those of various other servers described above. Thus, depending on the number of shoppers of system 100, the number of remote servers actively in operation may be scaled up or down, depending on operational needs. By way of example, FIG. 3 depicts a schematic diagram of a system including a plurality of remote servers, including a central database (DB) 302, local caches 304a-d, remoter servers 306a-d, and customers 308.

Central DB 302 may represent one or more centralized databases of system 100. Centralized databases may refer to memory storage containing data that are common to the entire system, and are not particularly associated with any one of a single remote server. Central DB 302 may contain data representing products for sale on system 100, and any information that may be associated with these products.

Central DB 302 may include one or more logically and/or physically separate databases configured to store data and/or instructions. In one exemplary embodiment, Central DB 302 may be implemented using a non-transitory computer-readable storage medium. In another exemplary embodiment, Central DB 302 may be maintained in a network attached storage device, in a storage area network, or combinations thereof, etc. Central DB 302 may store the data on storage devices, which may include, for example, hard drives, RAID arrays, solid state drives, NOR or NAND flash memory devices, and/or Read Only Memory (ROM) devices. Furthermore, Central DB 302 may be maintained and queried using numerous types of database software and programming languages, for example, SQL, MySQL, IBM DB2®, Microsoft Access®, PERL, C/C++, Java®, etc.

Local caches 304a-d may represent one or more local caches that are particularly associated with a remote server, such as remote servers 306a-d, respectively. A local cache may refer to computer memory storage, may hold data for a period of time. Local caches 304a-d may be hardware caches, such as a CPU cache, a GPU cache, and/or other data storage circuitry. Local caches 304a-d may also be software caches such as disk cache, page cache, web cache, and/or software program for memory and data management. Local caches 304a-d may contain data representing products for sale on system 100, and any information that may be associated with these products. In some embodiments, data contained in local caches 304a-d may be copies of some or all of data contained central DB 302.

Remote servers 306a-d may represent server devices or virtual servers that implement system 100 or one or more of its subsystems (e.g. external front end system 103). Each remote server may have resource limitations, and may thus only be able to support operations for a predetermined number of customers 308. For example, if each remote server can only support up to 250 customers at any given time, and there are 1000 customers, then, for example, remote server 306a may handle customer 1-250, remote server 306b may handle customer 251-500, and so on. In some embodiments, the number of remote servers in operation may increase or decrease depending on the number of customers using the system. Each remote server may access data from a corresponding local cache. For example, remote server 306a may access data stored in local cache 304a; remote server 306b may access data stored in local cache 304b; and so on. Advantages of such configuration will be described below.

Without the corresponding local caches, each remote server 306a-306d must access data from a centralized database 302. Depending on the number of customers and how frequently each customer access data, the amount of data traffic between the remote servers 306a-306d and centralized database 302 may be excessively high, requiring additional infrastructure (e.g. additional servers), or causing delay in communication. By replicating some or all data of the centralized database 302 on local caches 304a-304d, each remote server 306a-306d may locally access some of the data needed by the customer, eliminating a substantial amount of network traffic between servers 306a-306d and central database 302. Therefore, it may be advantageous to include as much data as reasonable on the local caches 304a-304d to eliminate unnecessary communication between each remote server 306a-306d and centralized database 302. In some embodiments, certain type of data may be preferably stored in local caches 304a-304d. For example, data related to products that are popular or otherwise generate high customer interest may be preferably stored in local caches 304a-304d, as local access to these data may have the greatest impact in terms of reducing network traffic between the remote servers 306a-306d and the centralized database 302.

However, from time to time, products listed for sale on system 100 may vary. For example, one or more new products may be added to system 100, and/or one or more existing products may be removed. Moreover, information regarding the products, such as price, promotional status, quantity, and other such information may change over time. Customer experience may suffer if customers access data that are outdated. Thus data stored in local caches must synchronized with the most up-to-date data, as well as with other the data in the local caches 304a-304d of the remote servers 306a-306d.

Figure 4:
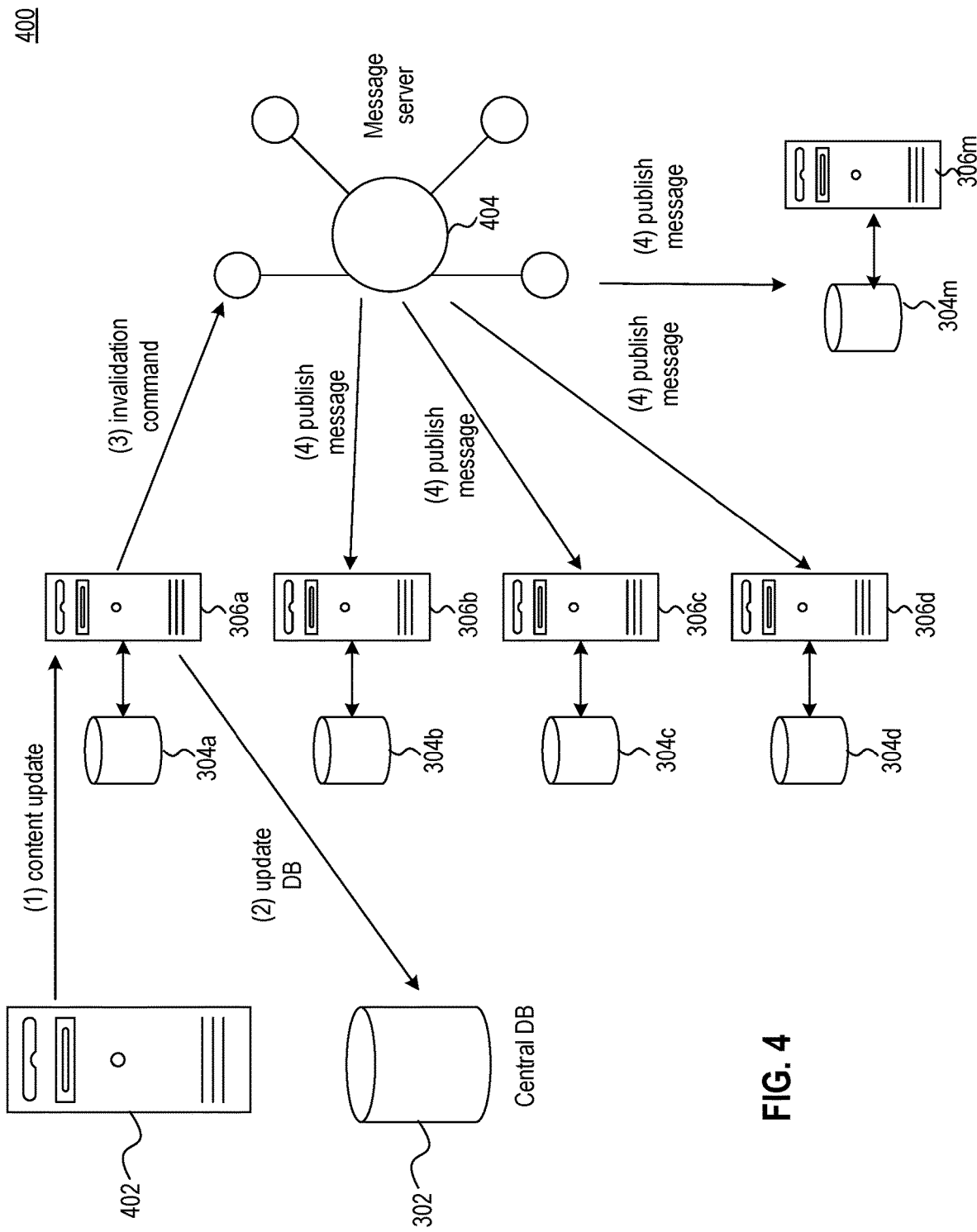
FIG. 4 is a schematic diagram demonstrating an exemplary process for updating local caches based on a content update, consistent with the disclosed embodiments.

By way of example, FIG. 4 depicts a schematic diagram demonstrating an exemplary process for updating local caches 304a-304d based on a content update associated with one or more products, consistent with the disclosed embodiments.

In one exemplary embodiment, server 402 may provide a content update. A content update may refer to an addition, deletion, modification, or any other change to data stored in any of local caches 304a-d. Server 402 may represent any server device or virtual server capable of transmitting data to other computer systems. In some exemplary embodiments, server 402 may carryout operations of one or more subsystems of system 100, such as internal front end system 105, seller portal 109, supply chain management system 117, and/or 3rd party fulfillment 121A-C. Server 402 may provide the content update to one or more of the remote servers 306a-d. In some embodiments, the remote server that first receives the content update from server 402 may be referred to as the first remote server (e.g. 306a).

The first remote server 306a, after receiving the content update, may update its corresponding local cache 304a. The first remote server may also in turn provide the content update to central DB 302, so that the corresponding data entry in central DB 302 may be updated. The first remote server 306a may then provide an invalidation command to message server 404 to inform the message server 404 that local caches 304a-304d require synchronization with the newest data. The invalidation command may include the necessary data to synchronize the local caches 304a-304d. For example, the invalidation command may be computer logic, software, code, or other instruction for causing one or more operations in a computerized database. By way of example in FIG. 4, remote server 306a may be the first remote server, and after it receives the content update from server 402, it may provide an update to central DB 302, and may generate an invalidation command to message server 404.

Message server 404 may represent a messaging system for propagating the invalidation command to all of the remote servers and their corresponding local caches. In some embodiments, message server 404 may be part of the cloud or virtual system infrastructure supporting remote servers 306a-d. For example, servers 306a-d may be virtual servers operating in a system of cloud computing, and message server 404 may be another virtual server, an application, or other software module capable of managing data communications within the system of cloud computing. An example of message server 404 may be a streaming message platform such as Kafka. After message server 404 receives the invalidation command, message server 404 may publish an update message to all remote servers 306a-306d. Stream processing may refer a computer programming or architecture that allows for some form of parallel processing, such applications can use multiple computational units (or servers) without explicitly managing allocation, synchronization, or communication among those units.

In some embodiments, the update messages are partitions generated by message server 404 based on the invalidation command. A partition, as used herein, may include subcomponents of the update messages which are propagated out of message server 404 in a parallel manner. After each of the remote servers 306a-306d receives the update message, each of the remote servers 306a-306d may update local caches 304a-304d, respectively, thus ensuring that all local caches 304a-304d may be synchronized.

Figure 5:
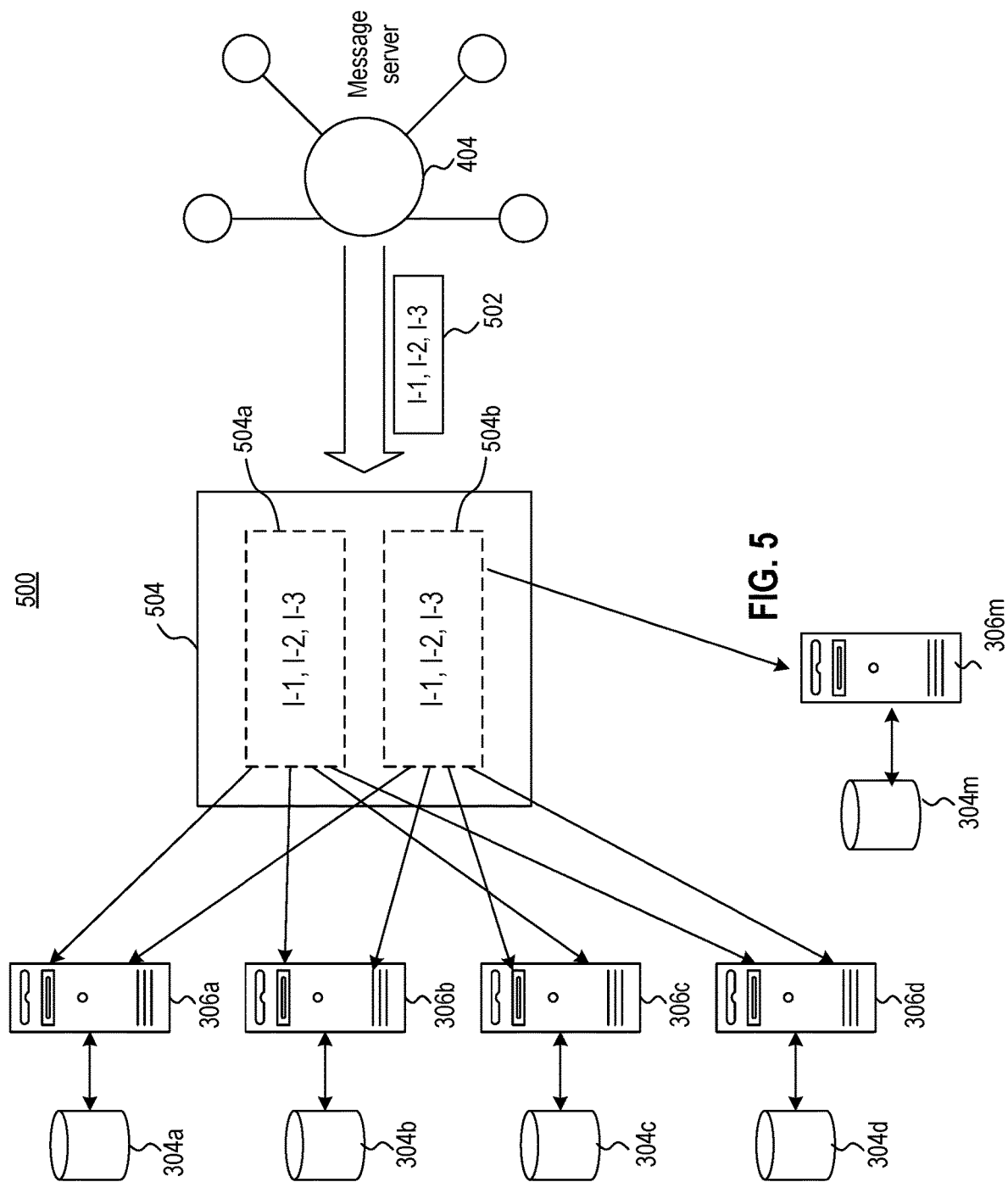
FIG. 5 is a schematic diagram of an exemplary partition propagation to a plurality of remote servers, consistent with the disclosed embodiments.

By way of example, FIG. 5 depicts a schematic diagram of an exemplary partition propagation to a plurality of remote servers 306a-306d, consistent with the disclosed embodiments. Data 502 may represent an exemplary invalidation command received by message server 404 from a first remote server (e.g. 306a). The invalidation command may contain data or instructions for synchronizing the local caches. In the example depicted, data 502 may contain data or instructions "I-1", "I-2", "I-3," etc. It is contemplated that data 502 may include any number of pieces of data or instructions. Message server 404 may generate partitions 504a and 504b based on the data 502. Thus, for example, as shown in FIG. 5, partition 504a may include subcomponents I-1, I-2, and I-3 of update message 502. Likewise, partition 504b may include subcomponents I-1, I-2, and I-3 of update message 502. Although only two partitions 504a and 504b are illustrated in FIG. 5, it is contemplated that message server 404 may generate any number of partitions 504a, 504b, . . . 504n. In some exemplary embodiments, the partitions 504a, 504b may be identical to each other. In the example of FIG. 5, partition 504a is identical to partition 504b, both of which may be copies of data 502.

In some exemplary embodiments, message server 404 may publish every partition 504a, 504b, etc. to every remote server 306a-306d. For example, even though partition 504a and 504b may be identical, message server 404 may nevertheless transmit both partitions to each and every remote server 306a-306d. In some exemplary embodiments, message server 404 may transmit all partitions to every remote server 306a-306d to ensure that when a new remote server 306a, 306b, 306c, or 306d is initialized during the synchronization process, the local cache of the new remote server 306a, 306b, 306c, or 306d will be synchronized.

Figure 6:
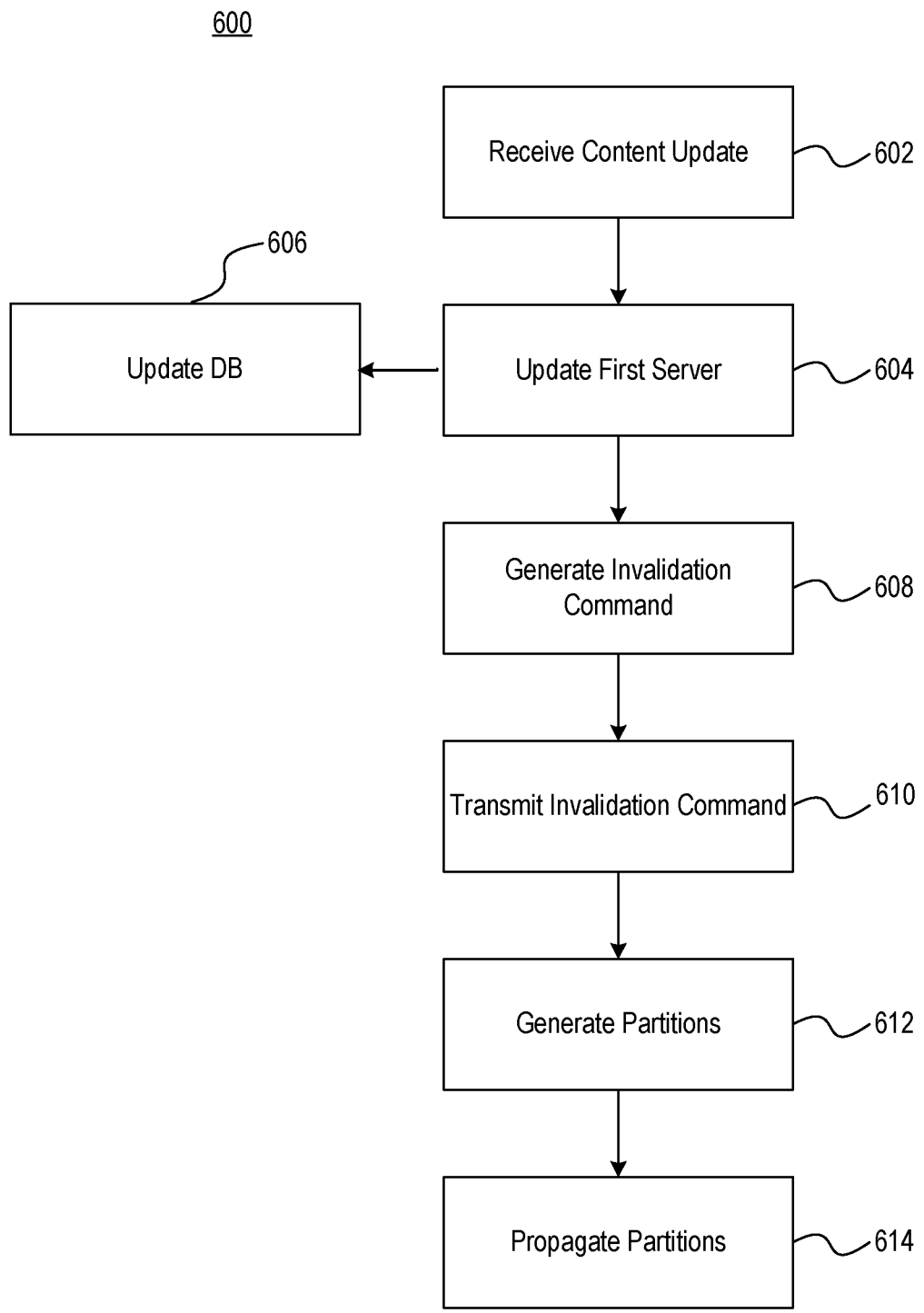
FIG. 6 depicts a flow chart of an exemplary process for synchronizing local cache, consistent with the disclosed embodiments.

FIG. 6 depicts a flow chart of an exemplary process 600 for synchronizing local caches 304a-304d, consistent with the disclosed embodiments. Process 600 describes various interactions between the different elements depicted in FIGS. 3, 4, and 5.

Step 602 of process 600 may include receiving a content update. As discussed previously, the content update may be an update to a data entry stored in local caches 304a-304d of each of a plurality of remote servers 306a-306d. The data entry may represent, for example, information relating to a product for sale. In some exemplary embodiments, the content update may be a command to remove a data entry corresponding to a product for sale from the local caches 304a-304d of remote servers 306a-306d. This may be done, for example, when a product has been sold out, or is removed from a promotional listing. The promotional listing may include products that are popular or are actively being marketed, and thus may be expected to generate high traffic. Thus, in some exemplary embodiments, products that may no longer be part of the promotional listing may be deprioritized from been stored in local caches 304a-304d. The content updated may be received, for example, by server 402 depicted in FIG. 4. The content update may be transmitted from an external system to server 402, or be generated by business staff using server 402.

Step 604 of process 600 may include transmitting the content update to a first remote server (e.g. 306a) of the plurality of remote servers 306a-306d to update a corresponding data entry in a local cache (e.g. 304a) of the first remote server 306a. For example, as depicted in FIG. 4, server 402 may transmit the content update to remote server 306a, which in turn may update the corresponding data stored in local cache 304a. In some embodiments, the first remote server 306a is a first one of the remote servers 306a-306d that may receive the content update. For example, remote server 306a may be substantially identical to remote servers 306b-d. By virtue of being the first to receive the content update, remote server 306a may be an example of the first remote server.

Process 600 may optionally include a step 606 of transmitting the content update to central database 302 to cause an updated of a data entry stored in central database 302. In some exemplary embodiments, the first remote server 306a may transmit the content update, or some other instructions or commands to centralized database 302 to ensure that centralized database 302 receives the most up-to-date information. For example, as depicted in FIG. 4, server 306a may update central DB 302 with the latest information. In some embodiments, centralized database 302 may be updated by other means. For example, server 402 may directly provide updates to central DB 302.

Step 608 of process 600 may include generating an invalidation command to message server 404. In some embodiments, the invalidation command may be configured to indicate the change in the corresponding data entry in the local cache 304a of the first remote server 306a. For example, the invalidation command may be computer logic, software, code, or other instruction for causing one or more operations in a computerized database.

Step 610 of process 600 may include transmitting the invalidation command from first remote server 306a to message server 404.

Step 612 of process 600 may include generating, by message server 404, one or more partitions (e.g. 504a, 504b, etc.) based on the received invitation command 502. In exemplary some embodiments, partitions represent portions of, or sub-components of a data stream communicated between computing devices. In other exemplary embodiments, message server 404 may generate the partitions that are identical to each other. In some embodiments, each of the partitions 504a, 504b includes a copy of the invalidation command. For example, as depicted in FIG. 5, message server 404 may generate partitions 504a and partition 504b, which are identical in content to each other. The content of 504a or 504b are the same content as invalidation command 502.

Step 614 of process 600 may include transmitting, from message server 404 to each of the plurality of remote servers 306a-306d, the plurality of partitions (e.g. 504a, 504b, etc.). In some embodiments, the plurality of partitions 504a, 504b, etc., may cause remote servers 306a-306d to update their respective local caches 304a-304d. By way of example, as depicted in FIG. 5, message server 404 transmits all partitions (both partition 504a and 504b) to remote servers 306a-d. When each of remote servers 306a-d receives a copy of either 504a or 504b, remote servers 306a-306d may update their corresponding local caches 304a-304d to ensure synchronization.

As discussed previously, in some exemplary embodiments, system 300 may perform active monitoring of remote servers 306a-306d for network traffic. For example, system 300 may monitor a number of customers 308 that may be using any one of remote servers 306a-d, how often local caches 304a-d are accessed, and other relevant metrics for maintaining operations of system 300. System 300 may determine, based on the monitoring, one or more overloaded remote servers 306a-306d, the overloaded remote servers 306a-306d may include one or more of the remote servers 306a-306d having network traffic greater than a threshold value. For example, when the number of customers 308 using remote server 306d exceeds a capability (e.g., exceeding a maximum number of users), or when all of remote server 306a-d may be unable to meet an operational demand (e.g., remote servers 306a-d may not be able to handle the volume of network traffic), or when one or more of remote servers 306a-d fails, system 300 may take additional steps to remedy to the overload.

For example, to remedy the above-described situation, system 300 may initialize a new remote server 306m having a local cache, new remote server 306m being additional to the remote servers 306a-306d. System 300 may then direct portions of the network traffic from at least one of the overloaded remote servers 306a-306d to new remote server 306m. In some embodiments, a local cache 304m of new server 306m may be configured to store the same data as local caches 304a-304d of remote servers 306a-306d. By way of example, in the situation that one or more of remote servers 306a-d is unable to meet the demand, an additional new remote server 306m may be initialized, and this newly initialized remote server (or new remote 306m) may also include a local cache 304m storing data identical to the local caches 304a-d. As used herein, initialization may refer to a process or operational steps where a new remote server is created or connected to the existing remote servers. Initializaiton may include setting up the new remote 306m for operation and local cache 304m for operation along with the existing remote servers and local caches.

In some exemplary embodiments, initialization of new remote server 306m may occur while system 300 is attempting to synchronize the local caches 304a-304d based on a content update. To ensure that newly initialized local cache 304m of new remote 306m is synchronized as well, message server 404 may ensure that the plurality of partitions 504a, 504b, etc. are configured to ensure that local cache 304m of new remote server 306m is updated regardless of a time of the initialization of new remote server 306m. For example, since each partition 504a, 504b, etc. is capable of synchronizing local caches 304a-304d, and multiple partitions 504a, 504b, etc. may be sent by message server 404, not all of the partitions 504a, 504b, etc. may be needed by a remote server 306a-306d to synchronize its local cache 304a-304d. Recall that the update message may be divided into partitions 504a and 504b, which are identical. Because message server 404 propagates the partitions in a parallel process, every partition is designed to reach every remote server. In the present embodiments, when both 504a and 504b alone are programmed to synchronized local caches, even if the newly initialized remote server 306m misses one of partitions 504a or 504b, its local cache 304m may be synchronized so long as at least one partition is received. For example, as depicted in FIG. 5, even if new remote server 306m misses partition 504a during its initialization, it may still receive partition 504b and would still be synchronized as an result.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed:

1. A computer-implemented system for synchronizing local caches, the system compromising:
   one or more processors; and
   at least one memory storage device storing instructions that when executed by the one or more processors, cause the one or more processors to perform operations comprising:
   receiving a content update, the content update including an update to a data entry stored in a local cache of each of a plurality of remote servers;
   transmitting the content update to a first remote server of the remote servers to update a corresponding data entry in the local cache of the first remote server;
   generating an invalidation command configured to indicate a change in the corresponding data entry in the local cache of the first remote server;
   transmitting the invalidation command from the first remote server to a message server;
   generating, by the message server, a plurality of partitions based on the received invalidation command, the plurality of partitions comprising a first partition and a second partition, the first partition and the second partition being separate and identical;

transmitting, from the message server, to each of the remote servers, the plurality of partitions, wherein the plurality of partitions causes each of the remote servers to update the respective local cache.

2. The computer implemented system of claim 1, the operations further comprising
transmitting the content update to a central database to cause an update of a data entry stored in the central database.

3. The computer implemented system of claim 2, wherein the data entry stored in the local cache of each of the remote servers and the data entry stored in the central database are associated with a product for sale.

4. The computer implemented system of claim 3, wherein the content update is a command to remove the data entry corresponding to the product for sale from the local cache of each of the remote servers.

5. The computer implemented system of claim 1, the operations further comprising:
monitoring the remote servers for network traffic;
determining, based on the monitoring, at least one overloaded remote server, the overloaded remote servers including one or more of the remote servers having network traffic greater than a threshold value;
initializing a new remote server having a local cache, the new remote server being additional to the remote servers; and
directing portions of the network traffic from the at least one overloaded remote server to the new remote server, wherein the local cache of the new remote server is configured to store the same data as the local cache of each of the remote servers.

6. The computer implemented system of claim 5, wherein the plurality of partitions is configured to ensure that the local cache of the new remote server is updated regardless of a time of initialization of the new remote server.

7. The computer implemented system of claim 1, wherein each of the partitions includes a copy of the invalidation command.

8. The computer implemented system of claim 1, wherein the first remote server is a first one of the remote servers that receives the content update.

9. The computer implemented system of claim 1, wherein the message server is a stream processing server.

10. A computer-implemented method for synchronizing local caches, compromising:
receiving a content update, the content update including an update to a data entry stored in a local cache of each of a plurality of remote servers;
transmitting the content update to a first remote server of the remote servers to update a corresponding data entry in the local cache of the first remote server;
generating an invalidation command configured to indicate a change in the corresponding data entry in the local cache of the first remote server;
transmitting the invalidation command from the first remote server to a message server;
generating, by the message server, a plurality of partitions based on the received invalidation command, the plurality of partitions comprising a first partition and a second partition, the first partition and the second partition being separate and identical; and
transmitting, from the message server, to each of the remote servers, the plurality of partitions, wherein the plurality of partitions causes each of the remote servers to update the respective local cache.

11. The computer implemented method of claim 10, further comprising:
transmitting the content update to a central database to cause an update of a data entry stored in the central database.

12. The computer implemented method of claim 11, wherein the content update is a command to remove the data entry corresponding to a product for sale from the local cache of each of the remote servers.

13. The computer implemented method of claim 10, further comprising:
monitoring the remote servers for network traffic;
determining, based on the monitoring, at least one overloaded remote server, the overloaded remote servers including one or more of the remote servers having network traffic greater than a threshold value;
initializing a new remote server having a local cache, the new remote server being additional to the remote servers; and
directing portions of the network traffic from the at least one overloaded remote server to the new remote server, wherein the local cache of the new remote server is configured to store the same data as the local cache of each of the remote servers.

14. The computer implemented method of claim 13, wherein the plurality of partitions is configured to ensure that the local cache of the new remote server is updated regardless of a time of initialization of the new remote server.

15. The computer implemented method of claim 10, wherein each of the partitions includes a copy of the invalidation command.

16. The computer implemented method of claim 10, wherein the first remote server is a first one of the remote servers that receives the content update.

17. A computer-implemented system for synchronizing local caches, compromising:
one or more processors; and
at least one memory storage device storing instructions that when executed by the one or more processors, perform operations comprising:
receiving a content update, the content update being a command to remove a data entry stored in local caches of a plurality of remote servers;
transmitting the content update to a first remote server of the remote servers to remove a corresponding data entry in the local cache of the first remote server;
generating an invalidation command to a message server, the invalidation command being configured to remove the corresponding data entry in the local cache of the first remote server;
transmitting the invalidation command from the first remote server to the message server, the message server being a stream processing server;
generating, by the message server, a plurality of partitions, each of the partitions including a copy of the invalidation command, the plurality of partitions comprising a first partition and a second partition, the first partition and the second partition being separate and identical; and
transmitting, from the message server to each of the remote servers, the plurality of partitions, wherein the partitions cause the remote servers to remove a corresponding data entry in their respective local caches.

* * * * *